[11] 3,610,971

[72] Inventor William J. Hooper
       Sarasota, Fla.
[21] Appl. No. 816,366
[22] Filed Apr. 15, 1969
[45] Patented Oct. 5, 1971
[73] Assignee Electrodynamic Gravity, Inc.

[54] ALL-ELECTRIC MOTIONAL ELECTRIC FIELD GENERATOR
     5 Claims, 8 Drawing Figs.

[52] U.S. Cl. ................................................. 310/10
[51] Int. Cl. ........................................................ H02n 11/00
[50] Field of Search ............................................ 310/10, 11;
                            324/109; 336/181, 225; 338/284, 297

[56] References Cited
         UNITED STATES PATENTS
2,553,875  5/1951  Shaw .............................. 338/284 X
3,259,784  7/1966  Vogel .............................. 338/297 X

OTHER REFERENCES

Textbook—The Electromagnetic Field in Its Engineering Aspects by G. W. Carter, 2nd Edition, 1967, Published by Longmans— 48 Grosvenor St. London W.1, pp. 168, 169, 170 (Copy in Central Library, Washington, D.C.)

The Feynman Lecture on Physics by Feynman, pages 13–6 to 13–11; Addison-Wesley Publishing Co., New York.

*Primary Examiner*—D. X. Sliney
*Attorney*—Oldham & Oldham

ABSTRACT: This invention relates to an all-electric generator yielding a motional electric field in the space surrounding the device, but requiring no mechanical movements of its parts in generating this field. The Theory underlying the production of such a field postulates that each moving electron constituting the current in a linear conductor carries with it a loop of magnetic field energy about it.

PATENTED OCT 5 1971          3,610,971

INVENTOR.
WILLIAM J. HOOPER
BY
Oldham & Oldham
ATTORNEYS.

3,610,971

ALL-ELECTRIC MOTIONAL ELECTRIC FIELD GENERATOR

This application is an extension of the teachings presented in my earlier filed pending applications, Ser. Nos. 722,587, filed Apr. 19, 1968 and 803,187, filed Feb. 28, 1969.

PRIOR HISTORY

The detection of a magnetic flux about a current-carrying conductor was first made in 1820 by Hans Christian Oersted. This discovery unified the then separate sciences of electricity and magnetism. My experimental discovery that this magnetic flux actually moves along the conductor electric charges the electric charges constituting the current has great promise of now unifying the three known fields of electricity, magnetism and gravitation.

For a better understanding of the invention, reference should be had to the accompanying drawings wherein.

BACKGROUND INFORMATION

Figure 1:
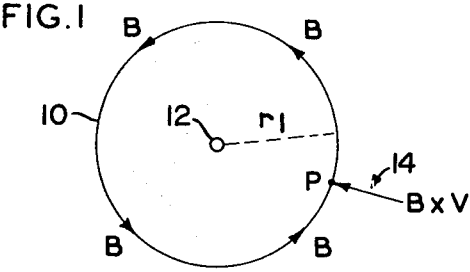
FIG. 1 is a schematic illustration of a wire containing flowing electrical current indicating the magnetic field generated with respect thereto.

The law of Biot and Savart yields the magnetic flux density $B$ (webers/m.$^2$) at a point distant $r$ meters from the conductor carrying a current of $I$ amperes and is given by $$B = \mu_0 I / 2\pi r \quad (1)$$

where $\mu_0 = 4\pi \times 10^{17}$ webers/amp. meter. With reference to FIG. 1 of the drawings, this flux consists of circular magnetic loops directed counterclockwise, as shown by arrow 10, for current directed in a linear conductor wire 12 at right angles to this paper and outwardly toward the reader.

Electrons producing this flux will be moving perpendicularly into the paper, carrying the flux $B$ with them, at a velocity $V$ meters/sec. Thus, at any point P, distant $r_1$ from the long linear conductor 12, there will be existent a motional electric field of intensity $E = B \times V$ volts/meter directed radially inward toward the wire in the plane of the paper, as indicated by vector arrow 14, where $B \times V$ is the vector cross product of $B$ and $V$.

PREFERRED EMBODIMENT

Figure 2:
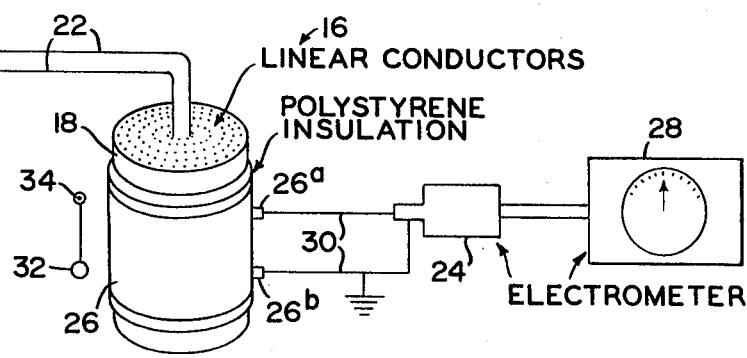
FIG. 2 is a perspective block diagram schematic of a preferred embodiment of the invention.

The preferred embodiment of the invention is illustrated in FIG. 2 and consists in part of many insulated linear conductors indicated generally by numeral 16, all parallel, packed and held in close proximity, and connected in series, so as to form a solid package 18 preferably cylindrical in shape. When a constant direct current from a source 20 is caused to flow through wires 22 this device with its axis in the vertical direction, half of the linear conductors 16 will have current flowing upward and half downward. It will be a noninductive device, since surrounding it the magnetic flux due to the upward currents will be superimposed on the flux due to the downward currents, so that no magnetic flux can be measured. On the well recognized "Principle of Superposition of Fields," each one exists however, and acts as though the other was absent.

When the package 18 of linear conductors has a circular cross section there will exist two systems of circularly directed magnetic flux, one directed clockwise and the other counterclockwise as seen from above, nd one set moving upward and the other set moving downward. What is of capital interest however is that each of these two systems give rise to equal radially and inwardly directed $B \times V$ motional electric fields distributed laterally in horizontal planes in the space about the cylindrical device. Here we have a field which is not magnetic, is not electrostatic, and which I have shown experimentally to be immune to electrostatic shielding. No such spacially distributed field is known to Physics today except that of gravity. I have shown theorectically that this field should act attractively on electrically neutral matter. I have shown experimentally that the intensity of this field can be measured with the aid of an electrometer system 24, 28 driven by the potential difference induced electromagnetically in the conductors 30 connecting the electrometer to the capacitor plates 26a and 26b of the capacitor 26. The electrometer head 24 actuates a visual dial indicator 28.

At cryogenic temperatures the drift velocity of the electrons in the linear conductors will be greatly enhanced. Theoretical calculations indicate that this velocity in copper at 20° C. is of the order of $3.6 \times 10^{12}$ cm./sec. in a current density of 480 amp./cm$^2$. The random velocity of free electrons in conductors is theoretically estimated at $10^8$ cm./sec. At superconducting temperatures when the electrical resistance approaches zero, it is generally believed that the drift velocity of electrons approaches the value of $10^8$ cm./sec. This velocity is $10^{10}$ times greater than the velocity at 20° C. (See "Physics," Halliday and Resnick, pages 681 and 691, J. Wiley, 1962). This indicates that the intensity of the $B \times V$ field about the device, herein described, might possible be enhanced $10^{10}$ times at or near the absolute zero of temperature. Hence, the invention contemplates that each of the devices described hereinafter will preferably be operated at or below the critical temperature at which the conductor used becomes superconducting. As the state of the art advances new conducting materials will undoubtedly become available with critical temperatures very considerably above the absolute zero.

Not only does the device that has been described in FIG. 2 afford apparatus hitherto unavailable for the generation of a spacial distribution of the motion electric field, but it affords means for investigating the properties of this field in connection with its relation to gravity and antigravitational phenomena. In addition, it affords for the first time, a direct experimental method for determining the electron drift velocities and mobilities in linear conductors made of different materials.

When the cylindrical capacitor 26 is charged by the $B \times V$ field and its potential difference (P.D.) measured, it is determined by the equation $$\text{P.D. (volts)} = B \times V \cdot l \quad (2)$$

where $l$ is the distance between the thin capacitor plates. The direct measurement of $V$ meters/sec. can then be made $$V = \text{P. D. (volts)}/ Bl \text{ m./sec.} \quad (3)$$

where $B$ is in webers/m.$^2$.

This device will exhibit an attractive force on electrically neutral matter, better defined as a differential force; i.e. the difference between a pull and push, in which the pull is greater. (See reference to general theoren, page 125, The Mathematical Theory of Electricity and Magnetism, by Sir James H. Jeans) The $B \times V$ field is an electrical field acting on all the elementary charges comprising the atoms of matter, electrons, protons and even neutrons, as I believe neutrons also consist of electrons and protons in close bond. The $B \times V$ force being relatively weak does not ionize the atoms of matter, but being immune to shielding, electrically polarizes them. This causes a slight elongation of some of the electrons orbits within the atoms in the direction of the field. The positive charges move slightly into the more intense region of the converging, radially directed field while the negative charges move slightly further way from the device into the weaker portion of the field. Thus the differential force between the pull and the push upon the component parts of an atom results in the polarization of the atoms and a resultant attractive force, equivalent, I believe, to that of gravity.

A small, electrically neutral, simple pendulum 32 suspended close to one side of my device of FIG. 2, about pin 34, should thus undergo a slight measurable deflection under a fairly strong $B \times V$ motional electric field. At cryogenic temperatures this attractive force should be greatly enhanced. When the device is lying horizontally, a gravity meter placed centrally over it should give a measurable reading in milligals.

Figure 3:
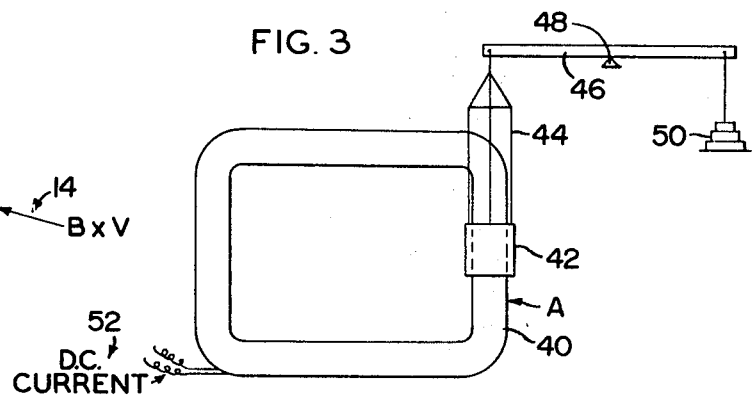
FIGS. 3 and 4 illustrate modifications of the generator of FIG. 2 adapted to techniques for studying and utilizing gravitational and antigravitational phenomena.
Figure 4:
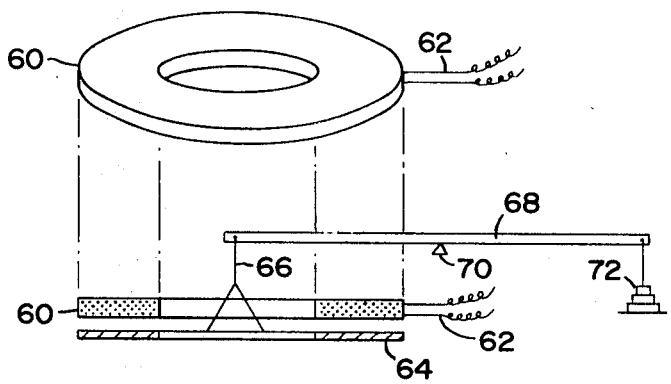

Modifications of my generator such as are shown in FIGS. 3 and 4 show diverse methods for studying gravitational and antigravitational phenomena which the invention makes possible. FIG. 3 illustrates a rectangular coil 40 made up of a single wire passed many times in the coil configuration so as to provide a large leg A preferably having a circular cross section. However, any cross-sectional configuration would meet the objects of the invention as long as the wires are parallel to each other and closely packed. About one leg of the coil, a cylindrical shell 42, made of electrically neutral, conductive or nonconductive material, is suspended by a carrier frame 44 from one end of a sensitive beam balance 46. The beam pivots about a support bar 48 and carries a load 50 to normally counterbalance the weight of the shell 42. When a fairly strong DC current I is fed through lines 52 and is built up in the coil, the flux density B is generated in the region of the cylindrical weight whose walls are a distance $r$ from the central axis of the coil and $n$ is the number of linear conductors in the coil.

$$B = \mu_o nI/2\pi r \text{ (webers/meter}^2\text{)} \quad (4)$$

If the current I is suddenly cut off the flux B will rapidly collapse. This flux in the act of collapsing should cross the walls of the suspended cylinder with a considerable inwardly directed horizontal velocity of V meters/sec. This should yield a very considerable vertical $B \times V$ in the walls of the cylinder directed either up or down, depending on the direction of the current in the coil.

In this device the motional electric field $B \times V$ is not convergent, but is uniformly vertical, hence the pull and push exerted on the electric components of the atoms in the cylinder will be equal. In other words the action of this field will either enhance or decrease the state of polarization already existing within the cylinder and produced by the gravitational field of the earth. If the polarization is increased, then the gravitational pull of the earth's field should be greater. If the polarization is decreased then the weight of the cylinder should be less. It is conceivable that the polarization could be reduced to zero. In this case, the object should be weightless. If the intensity of the depolarizing $B \times V$ field is still further increased, then polarization in the opposite direction to that produced by the earth's field should be achieved. In this event the earth's gravitational field would act repulsively on the cylinder. This would be antigravity in its truest sense.

The apparatus I have just been describing acts only momentarily (during the time interval in which the flux is collapsing) to change the weight of the cylinder shell 42 (shown in FIG. 3).

It is desirable to have an apparatus with which to experimentally study gravitational and antigravitational phenomena under steady continuous conditions. In FIG. 4 of the drawings is shown another modification of the device shown in FIG. 2. Here I utilize a noninductive coil wound in the form of a solid, low, thick walled, hollow, right circular cylinder, and indicated generally by numeral 60. DC current is supplied through lines 62 to the coil 60. In the region directly beneath this coil disk 60 I place a similarly shaped nonferrous disk 64, suspended by a carrier 66 to the end of a beam 68. The beam 68 is pivotal about a fulcrum 70 and is counterbalanced by a load 72. For positions of disk 64 below coil 60, the $B \times V$ field can only be directed vertically upward when a continuous DC current is flowing in the wires composing the disk 60. It should be noted that this field is practically uniform and parallel close to the disk, hence it is not attractive in its action on neutral matter. Its action on such matter can only change the state of electrical polarization in the matter. Any change thus effected in the state of polarization should cause the earth's gravitational field to act less intensely, on any object placed close to the under surface of the device, causing it to weigh less, become weightless, or to actually be accelerated upward by the anitgravitational action of the earth's field.

Figure 5:
FIG. 5 illustrates the winding of the wire in the device of FIG. 2.
Figure 6:
FIG. 6 illustrates the winding of the wire in the device of FIG. 4.

FIG. 5 of the drawings illustrates the manner in which the noninductive device in FIG. 2 is wound with wire 22, by turning the linear conductors back on themselves through a 180° turn. FIG. 6 illustrates the way the noninductive windings of the device illustrated in FIG. 4 is achieved. One very long insulated wire is simply turned back on itself at its midpoint and wound double into a solid coil held together in the shape illustrated.

Figure 8:
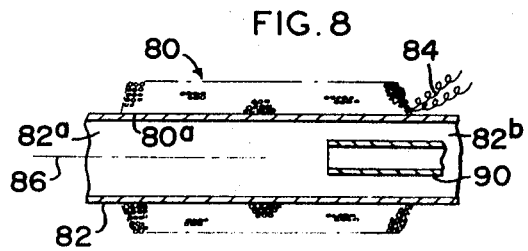
FIG. 8 illustrates a coil wound embodiment useful for producing the separation of oppositely charged ions in gases or liquids.

FIG. 8 illustrates a modified embodiment of the invention which comprises a wire coil 80 either simply wound, or noninductively wound, around a hollow tube 82. Electrical current is passed to the coil 80 through wires 84, and at low temperature this coil will produce a radially, outwardly directed, internal $B \times V$ field from the axis 86 of the cylinder to he internal circumference 80a of the coil 80. The electrical wire making up coil 80 is preferably a ribbonlike conductor which is coated with any appropriate electrical insulation. A minimum space between adjacent turns with concentricity between adjacent turns is the preferred winding embodiment for coil 80. As many courses of turns as deemed appropriate to generate field strength desired will meet the objects of the invention. The tube 82 is preferably made of material having little or no magnetic permeability. Both the coil 80 and tube 82 are stationary.

An apparatus of the type illustrated in FIG. 8 might be utilized to effect separation and concentration of fluids. For example, in the desalinization of water, a $B \times V$ electric field generated by the passage of the current through the coil 80, acts upon the disassociated ions of the sodium chloride in solution. Hence, by introducing a flow saline water at end 82a of tube 82, and providing a concentric separating tube 90 at end 82b of tube 82, increments of fluid which are concentrated with chlorine and depleted of solium may be drawn off through the stationary tube 90, while the increments of fluid which are concentrated with sodium and depleted of chlorine may be drawn off through the space between the exterior walls of tube 90 and the interior walls of tube 82.

FUTURE APPLICATIONS

This country's space projects have become expensive beyond the ability of the average man to comprehend. Achieving lift by means of costly propellants will some day soon be seen as akin to primitive man's use of awkward clubs as a means of exerting force. In a very short interval of time an intense $B \times V$ field should effect the reversal of the gravitational polarization of an object. Once achieved, only a very small expenditure of energy would be required to hold the polarization. Energy from the atoms of the earth would supply the lift and propulsion through the medium of the earth's gravity field. The most formidable problem would appear to be the problem of holding the $B \times V$ generator at cryogenic temperatures. In view of the overall possibilities of this invention, this problem does not appear to be incapable of a solution. A breakthrough in finding superconducting materials or even near superconducting at slightly elevated temperatures from those presently required would greatly aid in the solution of this problem.

Figure 7:
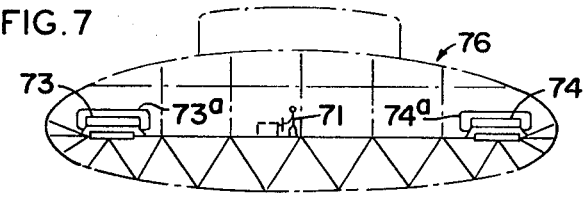
FIG. 7 illustrates the incorporation of a plurality of the devices of the invention into a spacecraft where they might be appropriately utilized.

FIG. 7 of the drawings illustrates in outline, the future possible application of this device, obtaining regulated lift by an operator 71 adjusting the current into the coils 73 and 74 which incorporate the structural features of the devices of FIG. 4. The antigravity gravity control features of the coils 73 and 74 thus control the lift and movement of vehicle 76. Suitable cryogenic generators 73a and 74a are associated with each of the coils 73 and 74 to provide the cooling thereof to as near absolute zero as possible to give the enhanced current passage characteristics necessary to the objects of the invention.

While I have demonstrated that AC current can be used in my device, it appears at present that DC current is much to be preferred.

This invention could be uniquely adapted to a communication system from one side of a solid barrier to the other side whether this barrier be solid concrete or battleship armor, by pulsing the $B \times V$ generator coil with signals, Morse Code or even voice modulated signals to be picked up by a capacitor-electrometer circuit on the other side of the barrier. Secret communications could be carried on and with the electrometer circuit as shown in FIG. 2 connected to a relay radio broadcasting unit, so that one might conceivably broadcast by radio from the interior of a solid metallic enclosure.

It is conceivable that the invention might be useful in the highly specialized art of concealed detonation devices. A detonating circuit connected to the capacitor electrometer receiving circuit of my device such as shown in FIG. 2 could be actuated through a solid barrier by out $B \times V$ generating coil placed on the other side of such a barrier.

It is conceivable that for some specialized purposes, it might be highly desireable to transmit electrical power from one side of a fixed solid barrier, concrete or armor plate, etc. by pulsing, DC or AC, in our $B \times V$ coil on one side of such a barrier. A resonant LC circuit could pick up these $B \times V$ pulsations and supply a source of electrical power on the other side of the barrier, in a manner somewhat analogous to my electrical receiving methods outlined in U.S. Pat. Application, Ser. No. 803,187, identified above.

In accordance with the patent statutes, only the best known embodiments of the invention have been illustrated and described in detail, but it is to be understood that the invention is not limited thereto or thereby, but that the scope of the invention is defined in the appended claims.

What is claimed is:

1. Apparatus for demonstrating an electrical phenomenon comprising,
   a coil made from an electrically conductive material having a very large plurality of sections compacted in close proximity arranged in substantially complementary relation around a common central axis, where the coil forms a solid cylindrical shape with the sections parallel to the axis thereof, and
   means to pass current through the coil so that about half the sections will pass current in a direction opposite to the other sections to cancel magnetic flux.

2. Apparatus according to claim 1 where adjacent sections are electrically insulated from each other, and the coil comprises a single wire bent back on itself to make the sections.

3. Apparatus according to claim 1 which includes means to increase the passage of electrical current through the conductor.

4. Apparatus according to claim 3 where the means to enhance is a cryogenic generator which reduces the temperature of the conductor o or below its critical temperature at which it becomes superconductive.

5. Apparatus according to claim 1 which includes an elongated hollow tube having an axis, the conductor formed around the tube.

UNITED STATES PATENT OFFICE
CERTIFICATE OF CORRECTION

Patent No. 3,610,971      Dated  October 5, 1971

Inventor(s)  William J. Hooper

It is certified that error appears in the above-identified patent and that said Letters Patent are hereby corrected as shown below:

Col. 1, line 14, after "conductor" insert -- with -- and delete "electric charges".

Col. 1, line 45, "$10^{17}$" should be -- $10^{-7}$ --.

Col. 2, line 4, "nd" should be -- and --.

Col. 2, line 25, "$3.6 \times 10^{12}$" should read -- $3.6 \times 10^{-2}$ --.

Col. 2, line 44, "motion" should be -- motional --.

Col. 4, line 7, "anitgravitational" should read -- antigravitational --.

Col. 4, line 22, "he" should be -- the --.

Col. 5, line 20, "out" should be -- our --.

Col. 6, line 26, after "conductor" delete "o" and insert -- to --.

Signed and sealed this 16th day of May 1972.

(SEAL)
Attest:

EDWARD M. FLETCHER, JR.           ROBERT GOTTSCHALK
Attesting Officer                 Commissioner of Patents